United States Patent Office 2,702,679
Patented Feb. 22, 1955

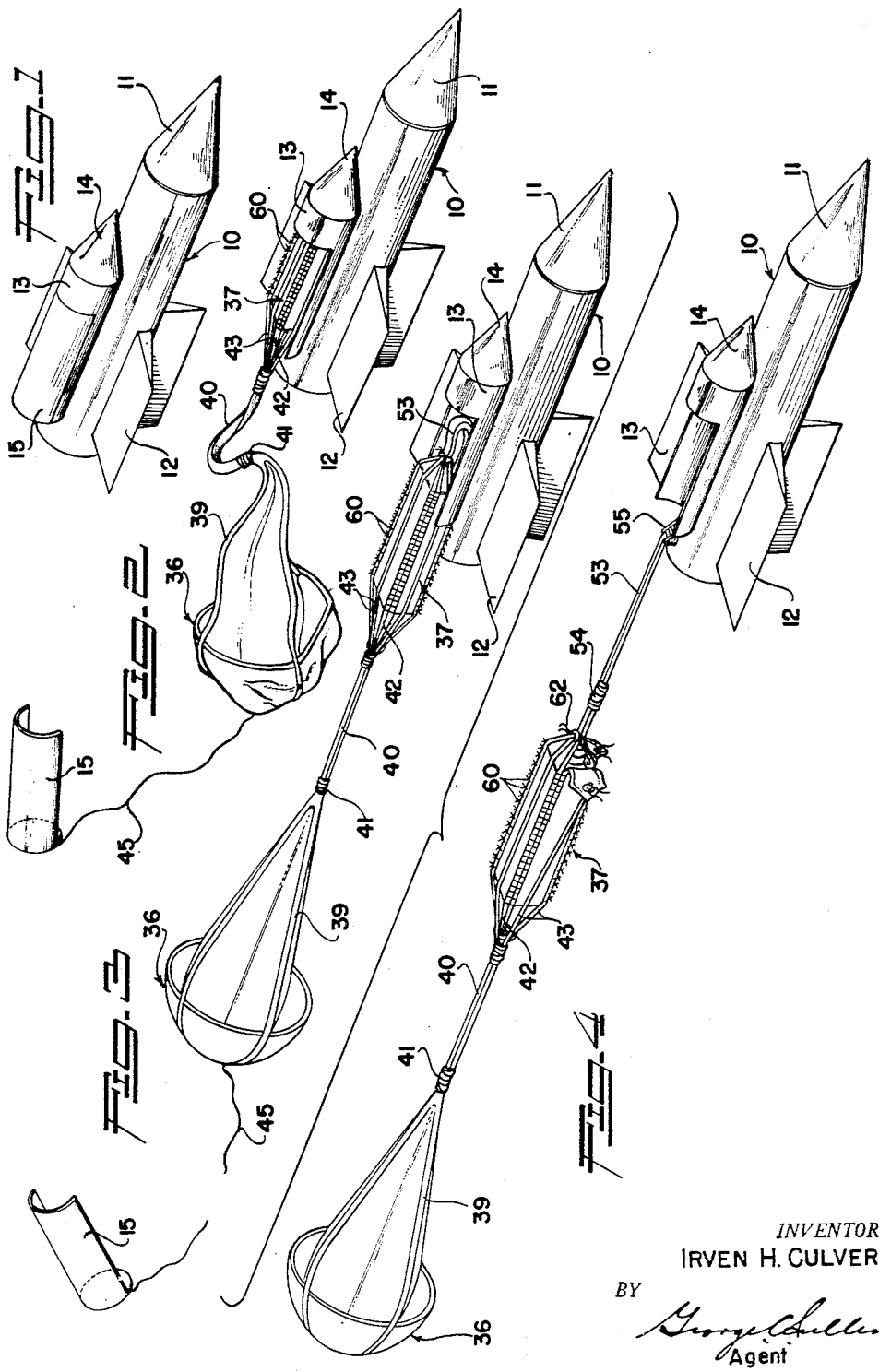

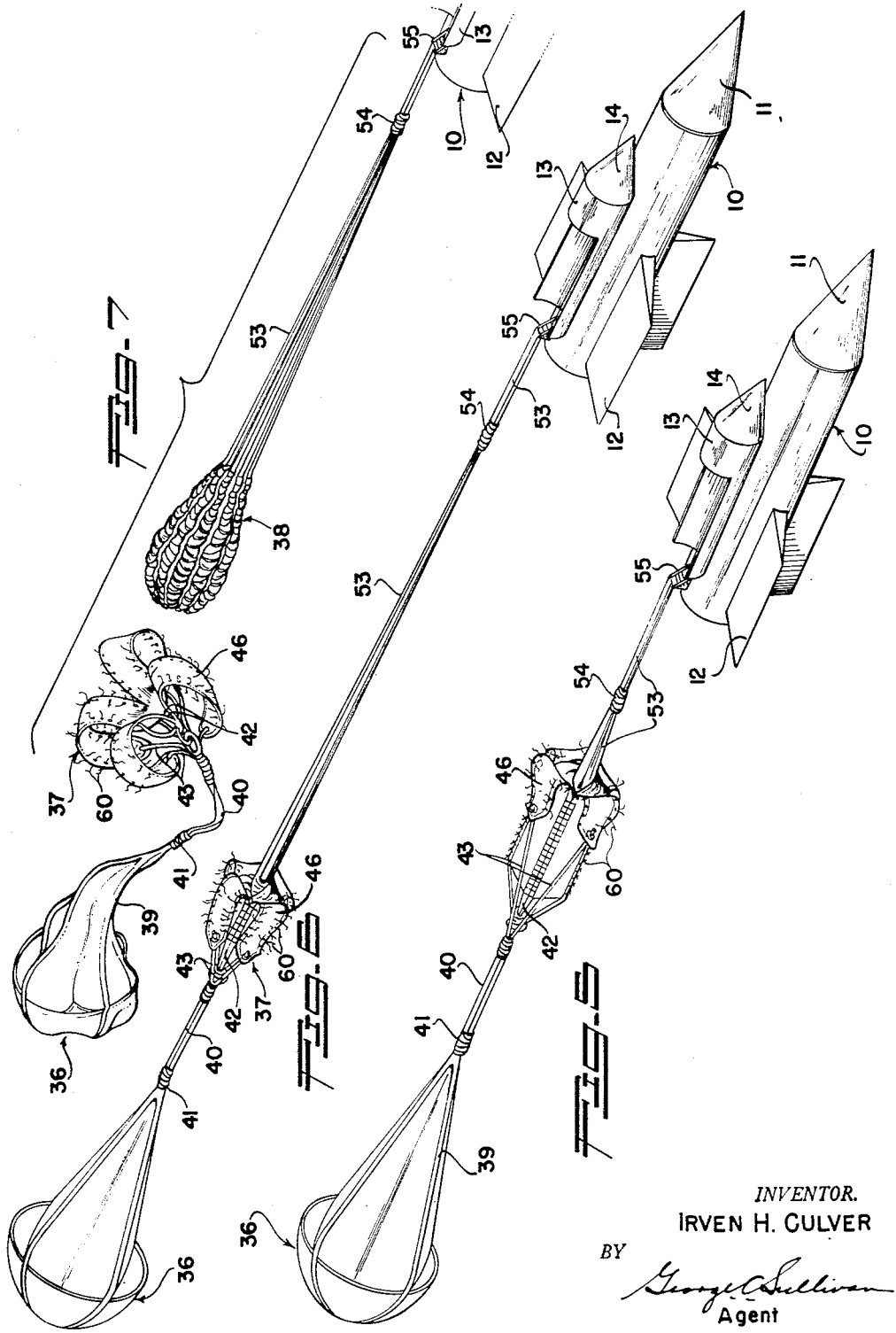

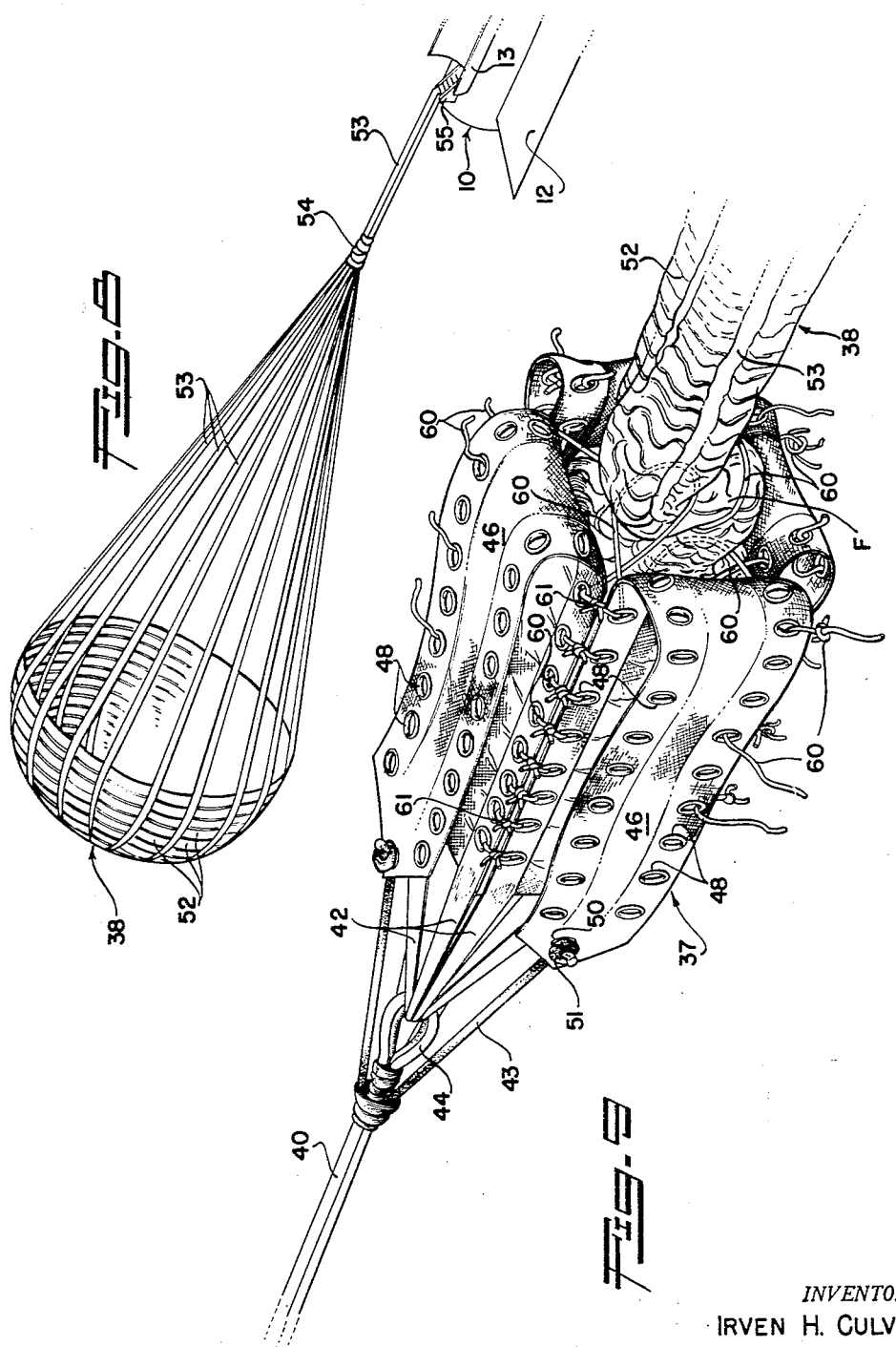

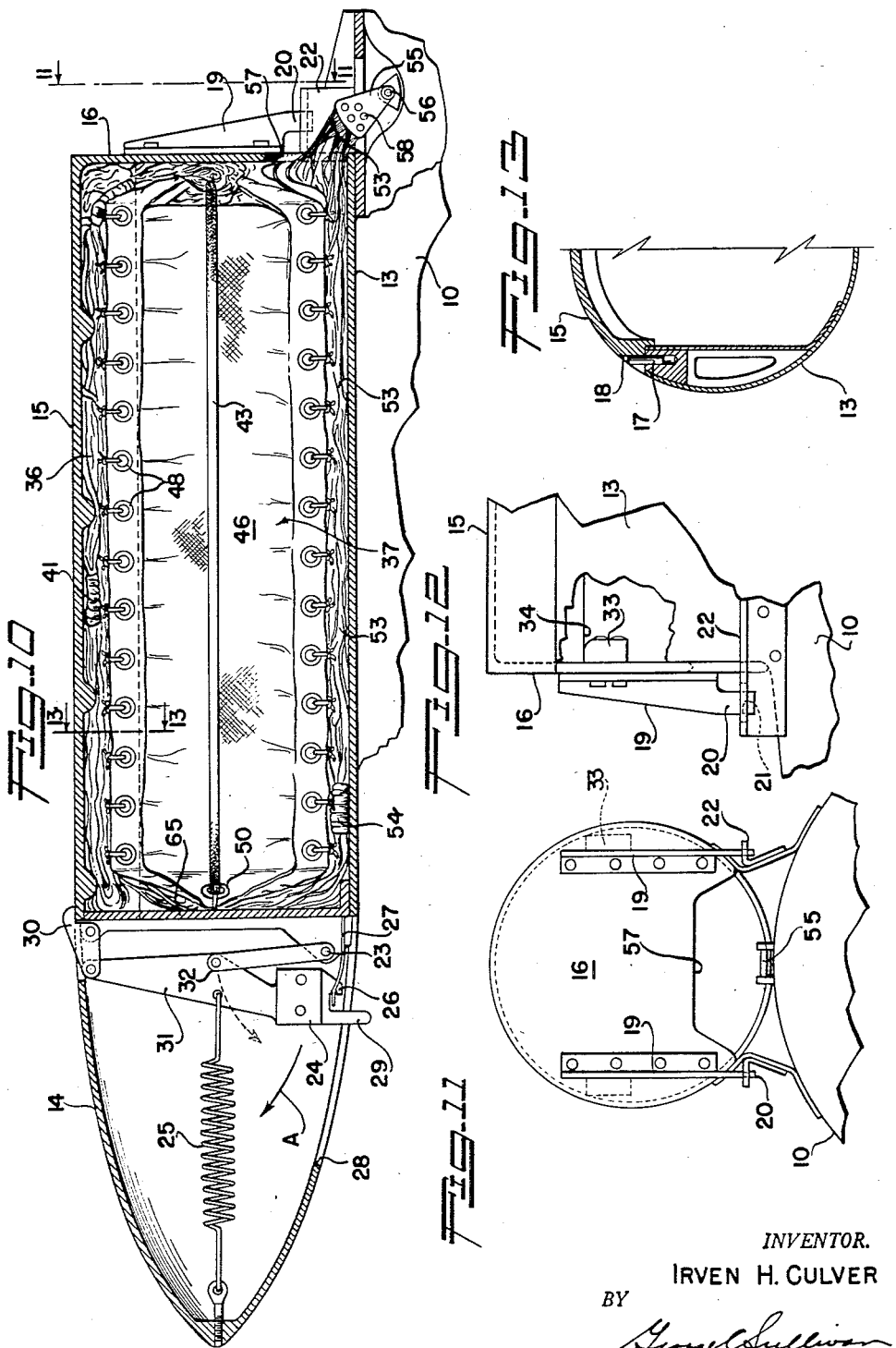

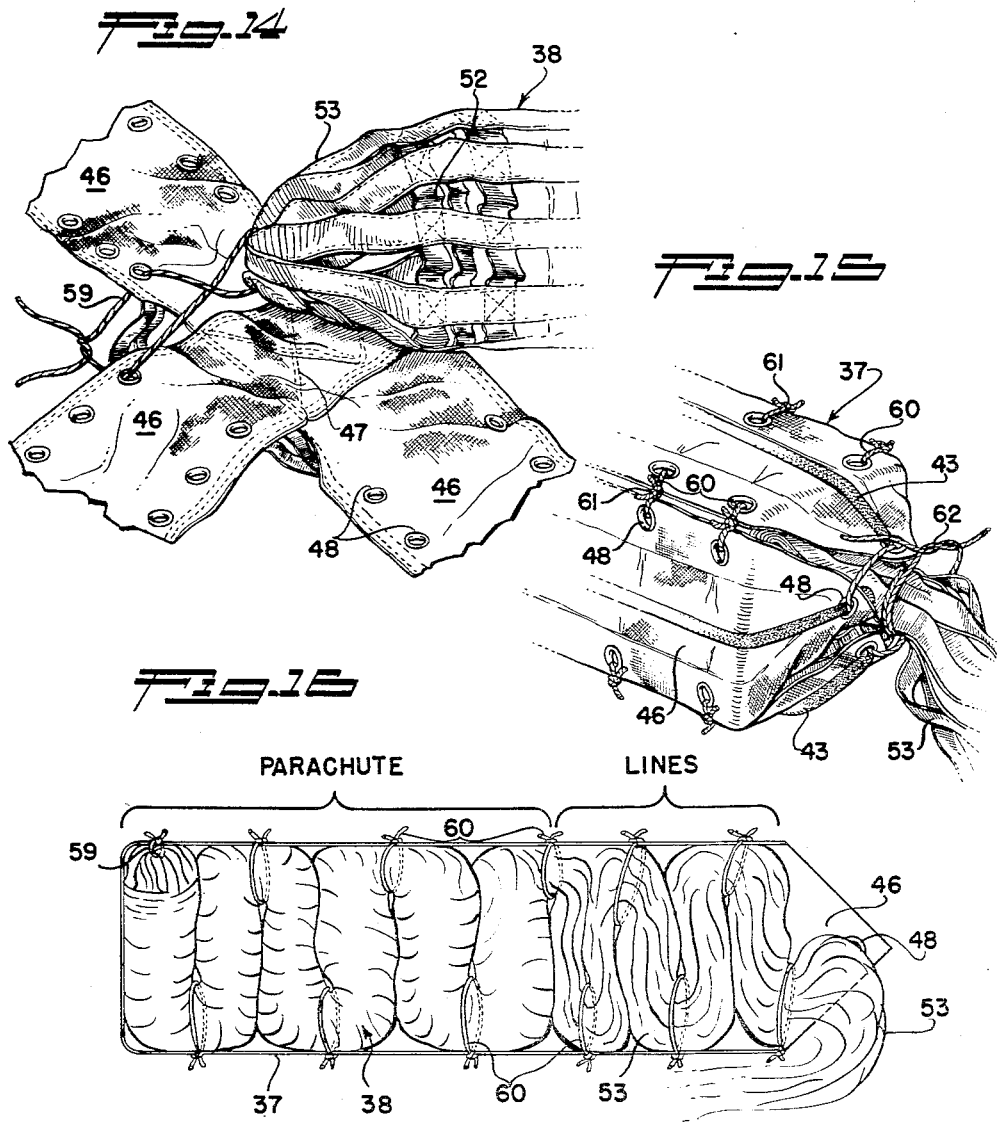

2,702,679

MEANS FOR THE DEPLOYMENT OF PARACHUTES AT HIGH SPEEDS

Irven H. Culver, La Canada, Calif., assignor to Lockheed Aircraft Corporation, Burbank, Calif.

Application November 15, 1949, Serial No. 127,431

8 Claims. (Cl. 244—139)

This invention relates to apparatus for effecting the reduced speed and/or descent of high velocity aerial vehicles, missiles, rockets, and the like, and relates more particularly to means for deploying parachutes from high speed aerial craft, etc.

Great difficulty has been experienced in deploying parachutes from aerial vehicles, missiles, and rockets at sonic and supersonic velocities. When conventional practices are employed in the parachute deployment systems for vehicles traveling at sonic and supersonic velocities, the parachutes become inverted, the risers and suspension lines become fouled, parts of the parachute assemblies are subjected to friction burns, etc. Apparently such failures are caused by the excessively rapid deployment of the parachute from its bag and so far as I am aware no practical expedient has been introduced which successfully overcomes this malfunctioning of the deployment systems.

It is a general object of the present invention to provide a simple, practical and dependable means for deploying parachutes from sonic and supersonic aerial vehicles.

Another object of the invention is to provide a parachute deployment means of the character referred to incorporating a pilot parachute connected with the bag which contains the main parachute or drag parachute, the deployed pilot parachute serving to open the bag for the deployment of the main parachute.

Another object of the invention is to provide a deployment system of the character described in which the main parachute or drag parachute is deployed from its bag in successive steps or stages so that its deployment is delayed or retarded to assure the successful complete opening of the parachute without fouling, failure, or inversion. The stage-by-stage removal of the parachute and its suspension lines from the bag prevents the excessively rapid deployment of the parachute and consequently avoids fouling of the lines, inversion of the parachute, etc.

A further object of the invention is to provide a parachute deployment means wherein the complete free detachment of the pilot parachute and bag is assured to leave the main or drag parachute clear and unencumbered.

Other objectives and features will become apparent from the following detailed description of a typical preferred form of the invention, throughout which description reference is made to the accompanying drawings, in which:

Figure 1 is a perspective view of an aerial rocket or high velocity vehicle provided with a canister containing the parachute deployment means of the invention;

Figure 2 is a view similar to Figure 1 showing the pilot parachute being deployed from the canister;

Figure 3 is a view similar to Figure 2, illustrating the pilot parachute extended and serving to deploy the bag from the canister;

Figure 4 is a view similar to Figure 3, illustrating the initial stages of the opening of the bag;

Figure 5 is like Figure 4, showing the bag further opened with the lines from the main or drag parachute being deployed;

Figure 6 is a view similar to Figure 5, showing additional portions of the lines of the main parachute deployed;

Figure 7 shows the bag and pilot parachute freed from the main parachute with the latter entirely deployed;

Figure 8 is a fragmentary perspective view showing the opened deployed drag parachute;

Figure 9 is an enlarged perspective view of the main parachute and bag assembly illustrating the manner in which the bag is successively opened to deploy the parachute;

Figure 10 is an enlarged longitudinal sectional view of the canister assembly and bag showing the manner in which the pilot parachute and lines are packed in the canister;

Figure 11 is an end view of the canister assembly with the lines removed, being a view taken substantially as indicated by line 11—11 on Figure 10;

Figure 12 is a fragmentary side elevation of the aft portion of the canister with a part broken away;

Figure 13 is a fragmentary vertical sectional view taken substantially as indicated by lines 13—13 on Figure 10;

Figure 14 is a fragmentary perspective view of the extended bag illustrating the manner in which the apex of the main parachute is secured in the bag;

Figure 15 is a fragmentary perspective view of the aft end of the bag showing the manner in which the end of the bag is tied or closed; and Figure 16 is a longitudinal schematic view of the bag and parachute assembly with legends indicating the position of the parachute proper and its lines within the bag.

The parachute deployment system or means of the invention is capable of use in association with high velocity aerial vehicles, missiles, rockets, and craft of various kinds, and is adapted to be employed to decelerate not only such instrumentalities but also objects and personnel carried by high velocity aerial vehicles and devices. In the drawings I have shown the parachute deployment means in connection with an object or vehicle of the rocket propelled type, it being understood that the invention is not to be construed as limited or restricted to the particular form or application of the invention illustrated and described herein.

The vehicle 10, shown in the drawings and which may be considered as rocket motor driven, has a pointed or conical nose 11, and is provided adjacent its aft end with spaced tail fins 12 arranged to leave a large unobstructed area at the upper side of the vehicle. A longitudinally arranged canister 13 is mounted on the vehicle 10 in this clear or unobstructed zone adjacent the aft end of the vehicle. The canister 13 has a hollow conical or streamlined nose 14 and may be generally cylindrical in shape. A cover 15 closes a rather large opening in the top and rear of the canister 13 and is preferably partially cylindrical in shape to conform with the configuration of the canister. As best shown in Figure 13, dowel pins 17 are secured in the edge portions of the canister 13 and cooperate with notches 18 in the cover 15 to position the cover and to assist in releasably holding the cover against rearward movement. The rear end wall 16 of the cover 15, which closes the end of the canister 13, has spaced vertical strips 19 provided at their lower ends with tongues 20. These tongues 20 are releasably engaged in openings 21 provided in brackets 22 on the vehicle 10. The rear wall 16 of the cover 15 also has spaced stops 33 for engaging under an abutment 34 on the canister 13 to hold the rear end of the cover against upward displacement, see Figure 12. The stops 33 are rounded to swing free from the abutment when the cover is released.

The present invention is capable of use with canisters or containers of different types and it will be apparent that the cover 15 of the above described canister 13 may be released or opened by any appropriate means. The drawings illustrate an inertia latch mechanism for the cover 15 adapted for use with a rocket motor driven missile, craft or vehicle to retain the cover in position until the propelling force of the rocket motor terminates, allowing the vehicle to decelerate, whereupon the inertia latch releases to permit detachment of the cover 15. The latch mechanism includes a latch 30 pivoted between its ends in the upper portion of the canister 13 to have its nose engaged inwardly or downwardly against the forward edge portion of the cover 15 as shown in Figure 10. A lever 31 is pivotally connected with the forward end of the latch 30 and extends laterally or downwardly in the hollow nose portion 14 of the canister 13. A link 32 is pivotally connected with this lever 31 at a point intermediate its ends and the lower end of the link 32 is pivotally anchored in the canister at 23. The inertia lever 31 is provided adjacent its lower end with a weight 24 which may take the form of a block of lead, steel, or other high specific gravity material. It will be seen that relative forward movement of the weight 24 in the direction of the arrow A will cause pivoting of the lever 31 and release of the latch 30. A spring 25 is connected under tension between the lever 31 and the forward end of the nose 14 to yieldingly urge the lever forwardly. Safety means is provided to initially hold the lever 31 in the active position where the latch 30 holds the cover 15 in place. This means includes a small hook 26 on the lower end of the lever 31 adapted to be engaged by a spring 27. The spring 27, which may be in the form of a leaf spring or a spring wire, has its rear end anchored in the canister 13 and its forward end is either hooked or provided with an opening for cooperating with the hook 26, the spring 27 being designed to normally tend to flex out of engagement with the hook 26. A slot 28, in the lower end of the nose 14, gives access to the hook 26 and spring 27 and the lever 31 has a trigger finger 29 at its lower end which may extend through the slot 28 to facilitate setting or conditioning of the latch mechanism.

Assuming that the latch mechanism is set, as illustrated in Figure 10, and that the rocket motor of the missile or vehicle 10 is actuated, the rapid initial acceleration of the vehicle causes forward movement of the vehicle and canister 13 relative to the inertia lever 31 and this relative movement permits the spring 27 to disengage from the hook 26 and to flex outwardly or laterally to a position free of the hook. Thus the latch mechanism is automatically conditioned or "triggered" at the start of the flight. Upon sudden deceleration of the vehicle, for example when the rocket motor or other propulsive means terminates operation, there is relative movement between the lever 31 and the canister 13, the inertia lever 31 moving forwardly under the action of the weight 24 assisted by the spring 25. This movement of the lever 31 releases the latch 30 from the cover 15, allowing the cover to be blown free by the high velocity slip stream. The forward end of the cover 15 rises and the cover swings upwardly and rearwardly, freeing the stops 33 from the abutments 34 and releasing the tongues 20 from the brackets 22.

The parachute assembly, which is housed within the canister 13, includes a pilot parachute 36, a bag 37 connected with the pilot parachute 36 to be opened thereby, and the main parachute 38 connected with the vehicle 10 and contained within the bag 37. The pilot parachute may be of any selected or required type although it is usually desirable to employ a non-invertible pilot parachute constructed of nylon fabric panels or segments. The shrouds 39 of the pilot parachute 36 are joined to a riser 40, the shrouds and riser being served at 41 with webbing, or the like. The riser 40 is in turn connected with a bag harness 42, leading to the rear end of the bag 37. Elastic cords 43 also extend from the pilot chute riser 40 and are connected with the forward end of the bag 37, as will be more fully described below. There are four of these elastic cords 43 in the form of the invention illustrated and they are served to the riser 40 at or adjacent the eye or loop 44 of the riser which receives the harness 42. This is best illustrated in Figure 9. The above described cover 15 of the canister 13 is connected with the apex of the pilot parachute canopy by a break cord 45 so that the cover, which is the first element released from the missile or vehicle 10, may serve to deploy the pilot parachute 36 from the bag 37. The break cord 45 may be designed to fail at any selected pull, for example it may break upon being subjected to a tensile strain of say 100 lbs. It is to be understood that the pilot parachute 37 may be varied considerably in design, proportions, etc. and the invention is not to be considered to be restricted to the particular pilot parachute just described. Furthermore, in certain uses or applications of the apparatus it may be found desirable to reef the shrouds 39 or the skirt of the pilot parachute 36 or both.

The bag 37 and the manner of associating the main parachute 38 and its lines with the bag are important features of the invention. The bag 37 serves to house or contain the parachute 38 and in turn is arranged within the canister 13 to be deployed therefrom by the pilot parachute 36. As will be later described, the bag 37 is designed to be opened in stages to progressively expose or deploy the main parachute 38 and its lines. In accordance with the invention, the bag 37 is of sectional construction comprising a plurality of fabric flaps or panels 46 laced together around the folded and compressed parachute 38. There may be two, three, or more panels 46, depending upon the desired general configuration of the bag 37. In the arrangement illustrated, where the bag 37 is substantially square in transverse cross section, there are four like or identical flaps or panels 46. The panels 46 are formed of duck or similar material and are preferably lined with pongee, although other appropriate lining material may be used. The flaps or panels 46 are elongate and may be joined together by stitching 47, or the like, at the aft end of the bag. If desired, the four panels 46 may be provided by crossing two elongate strips at right angles and stitching them together at 47 so that the crossed stitched together portions of the strips form the rear wall of the bag 37. Pluralities of longitudinally spaced eyelets or grommets 48 are provided along the edges of the bag panels 46. The grommets 48 are preferably uniformly spaced along the margins of the panels and may engage through the bag harness straps 42, mentioned above. The straps 42, which are preferably formed of webbing, may extend along the margins of the panels 46 to reinforce the same and the eyelets 48 are secured through openings in the straps. The harness straps 42 continue rearwardly from the bag 37 and are engaged through the terminals loop 44 of the pilot parachute riser 40, as above described.

The elastic cords 43, which have their rear ends served or secured to the riser 40, extend forwardly along the sides of the bag 37 to its forward end, assuming the bag to be in the closed position as illustrated in Figures 2 and 3 of the drawings. These cords 43 may be constructed of stranded rubber, or the like, and their forward ends are secured to the forward ends of the bag panels 46 in any appropriate manner. There is a cord 43 for each panel 46 and I have shown the cords passed through grommets 50 in the forward ends of the panels 46 and knots 51 are tied in the ends of the cords to prevent their disengagement from the grommets. With the bag 37 packed and closed, the cords 43 are under tension and tightly engage against the sides of the bag, as shown in Figures 2 and 3.

The main parachute 38 is provided to reduce the velocity or speed of descent of the missile, craft, or vehicle 10, and the type and size of the parachute will, of course, depend upon the velocity of the vehicle, the weight of the vehicle, and other factors. In the drawings, I have shown a ribbon-type parachute 38 comprising fabric ribbons 52 arranged to form the lifting canopy of the parachute assembly. The parachute further includes a plurality of suspension lines 53 extending over the ribbons 52 which extend across the surface of the parachute canopy. The suspension lines 53 extend forwardly from the canopy and may be served together at 54 to form a riser-like bundle which continues forwardly to the vehicle 10. The extremities of the lines 53 are looped through a fitting 55 suitably secured at 56 to the vehicle 10. The fitting 55 is located adjacent the aft end of the canister 13 and the rear end wall 16 of the canister cover 15 has an opening 57 for freely passing the lines 53. The fitting 55 is swiveled or pivoted at 56 so as to accommodate the positions assumed by the lines 53. Appropriate reefing means may be associated with the main parachute 38 as the conditions of use may dictate although the present invention is not primarily concerned with the specific details of the parachute construction or its reefing. The suspension lines 53 cross one another at the apex or vent of the main parachute canopy as best shown in Figure 14.

The main parachute 38 is packed and tied in the bag 37 in such a manner that the parachute and its lines 53 are deployed from the bag to prevent excessively rapid deployment and the malfunctioning which usually accompanies deployment of parachutes at sonic and supersonic velocities. In packing the parachute 38 in the bag 37, the four flaps or panels 46 of the bag are laid out, as shown in Figure 14, and the parachute 38 is also laid out so that the apex or vent portions of its lines 53 are at the juncture of the bag panels 46. The lines 53 are laid out and paired or grouped in such a way that the pins or bolts 58 of the attachment fitting 55 may be passed through the looped ends of the lines to anchor the lines to the vehicle. A break cord 59 is engaged through the lines 53 at the apex of the parachute 38 and the cord is crossed and passed through the grommets 48 into adjacent panels 46 and then tied. This arrangement is clearly illustrated in Figure 14. A small section of the parachute 38 immediately below its apex, is then tightly folded and held together by a length of break cord 60 which is wrapped once around the folded or compacted part of the parachute. The bag panels 46 are then folded against the parachute and the break cord 60 is crossed and inserted in the end-most grommets 48 in the two adjacent panels 46 that are opposite those which received the above described line 59. This second cord 60 is then securely tied at the exterior of the bag. This compacting, folding and tying of the parachute is continued until the entire canopy of the parachute is contained in the bag 37. Figure 9 illustrates the successive folds F of the parachute and the break cords 60 engaged around the folds, then crossed and then tied at the grommets 48 of the bag. Although the packing of the parachute 38 may be varied, as desired, it is preferred to arrange the cords 60 in sequence, that is secure a cord 60 in the grommets 48 in one corner of the bag 37, wrap a second cord 60 around the next tight fold of the parachute, cross the cord and tie it at the grommets 48 in the adjacent corner of the bag, wrap a third cord 60 around a third fold of the parachute, cross this third cord and tie it at the grommets 48 in the third corner of the bag, and so on, until the entire parachute is folded and packed in the bag. This relationship of the cords 60 and the folds F of the parachute is shown in Figure 9. The cords 60 are securely tied at the exterior of the bag 37, having square knots 61, or the equivalent, and are cut to remove excessive cord material at the knots. It will be observed that the cords 60 not only hold the compacted folds F of the parachute 38 but also serve as lacings for the bag 37, securing the bag panels 46 together to contain the folded and compacted parachute. It is to be understood that the parachute 38 is pressed or forced tightly into the bag 37 as it is folded and tied, as just described.

When the canopy assembly of the parachute 38 has been folded, packed and secured in the bag 37, as just described, the suspension lines 53 are arranged in consecutive groups and these groups of lines are folded and tied in the bag 37 by cords 60 in the same manner as the canopy portion of the parachute. These groups of lines 53 are preferably folded and tied in this manner at one or two rows of the grommets 48 and the remainder of the lines 53 are thereafter folded as a single bundle and tied by the break cords at the successive rows of grommets 48, being firmly compressed into a single group. The riser portion of the lines 53 is packed, folded and tied in the same manner. Figure 16 diagrammatically illustrates the canopy portion of the parachute 38 and the lines 53 folded, packed and tied in the bag 37 by the break cords 60.

Following the packing and tying of the bag 37, it may be necessary to knead the bag to bring it to the desired uniform configuration. A sufficient length of the riser and lines 53 is allowed to extend from the pack or bag 37 to continue to the attachment fitting 55 when the bag 37 is installed in the canister 13. Figure 15 shows the lines 53 extending from the forward end of the bag 37. A break cord 62 is passed through the end-most grommets 48 of the bag 37, wrapped about the lines 53 where they extend from the bag and the cord is then tied. The several break cords 59, 60 and 62, may be of uniform strength, for example they each may be 100 lb. cords.

Upon packing the parachute 38 and its lines 53 in the bag 38 as just described, the elastic cords 43 are connected between the riser 40 of the pilot parachute 36 and the forward end of the bag 37 being tied under tension at the grommets 50. The packed bag 37 is then ready for stowing in the canister 13. The suspension lines 53 and the riser of the main parachute 38 are arranged in the bottom portion of the canister 13 to extend from the attachment fitting 55 to the forward end of the bag 37 which is arranged to have its forward end adjacent the front wall 65 of the canister compartment. The pilot parachute 36 is folded or arranged on the top of the bag 37 and its riser 40 extends to the rear end of the bag 37 which is adjacent the end wall 16 of the cover. With the cover 15 latched in place by the inertia controlled latch 30 and with the spring 27 engaged on the hook 26, the parachute pack and deployment means is in condition for use.

When the vehicle 10 is launched, the rapid acceleration accompanying the launching releases the spring 27 from the hook 26, as above described. So long as the forward acceleration remains substantially constant or does not decrease appreciably, the latch 30 remains in the latched position. However, upon any substantial deceleration of the vehicle 10, the inertia block 24, aided by the spring 25, moves the latch 30 to the released position. When this occurs the cover 15 flies free from the canister 13 and the break cord 45, which is connected between the cover and the apex of the pilot parachute 36, pulls, or assists in pulling the pilot parachute 36 from the open canister. This is illustrated in Figure 2. The high velocity slip stream of the sonic or supersonic vehicle 10 assures the positive deployment of the pilot parachute 36 and breaks the cord 45 to release the cover 15 from the pilot parachute. The pilot parachute 36 inflates almost immediately and exerts a drag or pulling force on the bag 37 so that the bag is drawn rearwardly out of the canister 13, as illustrated in Figure 3. The riser and lines 53 of the main parachute 38 are secured to the vehicle 10 at the fitting 55 so that the assembly of the inflated pilot parachute 36, its lines 39 and 40, the bag assembly 37 and the lines 53 are put under tension. This condition is illustrated in Figure 4. The substantial tension breaks the cord 62 at the forward end of the bag 37, the folded lines 53 in the bag 37 tending to straighten under the tension and operating to break the cord. With the cord 62 broken, the tensioned elastic cords 43 and the high velocity air stream, pull the forward terminal portions of the bag panels 46 outwardly and rearwardly, the cords 43 operating to prevent fouling and inversion of the flaps or bag panels. Figure 4 of the drawings clearly illustrates the forward terminal ends of the panels 46 bending or turning outwardly and rearwardly.

With the pilot parachute 36 inflated and with the forward terminals of the panels 46 freed as just described, the drag or tension on the bag assembly successively breaks the cords 60. The folds of the suspension lines 53 straighten under the tension and break their respective cords 60. Thus the lines 53 are deployed in a stage-by-stage manner and the panels 46 of the bag 37 are freed at their forward portions to be drawn rearwardly around the remainder of the packed bag 37. This condition of the apparatus is illustrated in Figure 5. With the lines 53 deployed from the bag 37 the folds F of the parachute 38 successively straighten out under the drag or tension supplied by the pilot parachute 36 and the cords 60 at the folds F are successively broken so that the bag 37 continues to open. Figures 6 and 9 illustrate the bag 37 being opened in this manner. It will be observed in Figure 9 that the parachute 38 freely deploys from the bag 37 without the possibility of fouling or the like. The deployment of the parachute 38 from the bag 37 continues until all of the cords 60 are broken, at which time the break cord 59 at the apex of the parachute 38 fails, freeing the pilot parachute 36 and the opened bag 37 from the main parachute 38. Figure 7 of the drawings shows the parachute 38 freed from the bag 37 and entirely deployed for inflation. In actual operation at supersonic speeds, it has been observed that the parachute 38 is deployed or freed from the bag 37 in a fraction of a second, that is all of the cords 62, 60 and 59 are broken and the bag 37 is completely opened and freed from the main parachute in this time. However, the stage-by-stage breaking of the cords, and the stage-by-stage deployment of the parachute 38 from the bag 37 prevents the excessively rapid deployment that would otherwise occur and accordingly avoids the malfunctioning that so often accompanies high speed deployment of parachutes.

Having described only a typical form of the invention I do not wish to be limited to the specific details herein set forth, but wish to reserve to myself any variations or modifications that may appear to those skilled in the art or fall within the scope of the following claims.

I claim:

1. In combination, a parachute having suspension lines, a bag for containing the parachute including a plurality of panels having adjacent separable margins extending longitudinally thereof, the parachute being arranged in the bag to have a plurality of folds and to have its lines extend from the bag, break cords engaged about said folds and lacing together said adjacent margins of the bag panels, and means for applying tension to the bag and said lines to break said cords and thus disconnect said margins to deploy the parachute from the bag.

2. Means for deploying a parachute from a high speed object, the parachute having suspension lines attached to the object, said means including a pilot parachute to be deployed from the object, a bag in which the first named parachute is contained to have successive folds and to have its lines extend from one end of the bag, the bag including longitudinal seams which open upon the application of tension to the bag and parachute assembly, and lines connecting the pilot parachute with the other end of the bag whereby the deployed pilot parachute applies tension to said assembly to open said seams and thus deploy said first named parachute.

3. Means for deploying a parachute from an object traveling at high velocities, the parachute having suspension lines connected with the object, said means including a pilot parachute to be deployed from the object, a bag in which the first named parachute is contained to have successive folds and to have its lines extend from one end of the bag, the bag including longitudinal panels having adjacent margins, break cords connecting said margins and engaged about said folds to be broken upon straightening of the folds, and lines connecting the other end of the bag with the pilot parachute so that the deployed pilot parachute is operable to apply tension to straighten said folds and thus deploy said first named parachute.

4. Apparatus for deploying a parachute from a high speed aerial vehicle, the parachute having suspension lines connected with the vehicle, said means including a pilot parachute to be deployed from the vehicle, a bag containing the first named parachute which is packed therein to have a longitudinal series of successive folds and to have its lines extend from one end of the bag, the bag including a plurality of panels having adjacent margins extending longitudinally of the bag, break cords spaced longitudinally of the bag and connecting said adjacent margins, each break cord being trained about a fold to be broken upon straightening of the fold and the longitudinally spaced break cords being trained about the successive folds, and means connecting the other end of the bag with the pilot parachute so that the pilot parachute is operable to exert a drag force which successively straightens said folds to break the break cords one after the other and thus disconnect said margins and allow step by step deployment of said first named parachute.

5. Apparatus for deploying a parachute from a high speed aerial vehicle, the parachute having suspension lines connected with the vehicle, said means including a pilot parachute to be deployed from the vehicle, a bag containing the first named parachute which is packed therein to have a longitudinal series of successive folds and to have its lines extend from one end of the bag, the bag including a plurality of panels having adjacent margins extending longitudinally of the bag, break cords spaced longitudinally of the bag and connecting said adjacent margins, each break cord being trained about a fold to be broken upon straightening of the fold and the longitudinally spaced break cords being trained about the successive folds, means connecting the other end of the bag with the pilot parachute so that the pilot parachute is operable to exert a drag force which successively straightens said folds to break the break cords one after the other and thus disconnect said margins and allow step by step deployment of said first named parachute, and elastic cords for drawing said panels outwardly away from said first named parachute as the break cords are successively broken.

6. Apparatus for controlling the descent of an aerial vehicle comprising a main parachute having suspension lines connected with the vehicle, an openable bag for containing the main parachute so as to have a series of successive folds and to have said lines extend from one end of the bag, the bag including a plurality of panels having adjacent margins and break cords connecting said adjacent margins and trained about said folds to retain the main parachute in the bag in a folded condition and to break and open the bag when the main parachute is subjected to tension which straightens said folds, a pilot parachute to be deployed from the vehicle, and a line connecting the other end of the bag with the pilot parachute so that the deployed pilot parachute is operable to deploy the bag from the vehicle and then tension the main parachute to stragihten said folds and thus break said cords.

7. Apparatus for controlling the descent of an aerial vehicle comprising a main parachute having suspension lines connected with the vehicle, an openable bag for containing the main parachute so as to have said lines extend from one end, the bag including separable panel sections and break cords securing said sections together and trained about the main parachute to hold the same in a folded condition in the bag so as to break and allow separation of said sections to open the bag when the main parachute is subjected to tension, a pilot parachute to be deployed from the vehicle, a canister on the vehicle containing the parachutes, a cover for the canister connected with the pilot parachute, means for releasing the cover to deploy the pilot parachute from the canister, and a line connecting the other end of the bag with the pilot parachute so that the deployed pilot parachute is operable to deploy the bag from the canister and then tension the main parachute to break said cords and deploy the main parachute from the bag.

8. Apparatus for controlling the descent of an aerial vehicle comprising a main parachute having suspension lines connected with the vehicle, an openable bag for containing the main parachute so as to have said lines extend from one end, the bag including panel sections having adjacent margins extending longitudinally of the bag, break cords connecting said margins of the panels and retaining the main parachute in the bag in a folded condition so as to break when the main parachute is subjected to tension, the breaking of the cords releasing said margins to open the bag, a pilot parachute to be deployed from the vehicle, a canister on the vehicle containing the parachutes, a cover for the canister connected with the pilot parachute, inertia actuated means for releasing the cover to deploy the pilot parachute from the canister, and a line connecting the other end of the bag with the pilot parachute so that the deployed pilot parachute is operable to deploy the bag from the canister and then tension the main parachute to break said cords and deploy the main parachute from the bag.

References Cited in the file of this patent
UNITED STATES PATENTS

| | | |
|---|---|---|
| 1,795,168 | Habermehl | Mar. 3, 1931 |
| 1,836,495 | Paulson | Dec. 15, 1931 |
| 2,146,990 | Rousselot | Feb. 14, 1939 |
| 2,337,168 | Smith | Dec. 21, 1943 |
| 2,389,578 | Quilter | Nov. 20, 1945 |
| 2,478,758 | Frieder | Aug. 9, 1949 |